(12) United States Patent
Jager et al.

(10) Patent No.: US 11,518,470 B2
(45) Date of Patent: Dec. 6, 2022

(54) METHOD AND APPARATUS FOR CONTROLLING A VEHICLE

(71) Applicant: ACCELERATED SYSTEMS INC., Waterloo (CA)

(72) Inventors: Willem Jager, Cambridge (CA); Tim Lambert, Guelph (CA)

(73) Assignee: ACCELERATED SYSTEMS INC., Waterloo (CA)

( * ) Notice: Subject to any disclaimer, the term of this patent is extended or adjusted under 35 U.S.C. 154(b) by 475 days.

(21) Appl. No.: 16/383,767

(22) Filed: Apr. 15, 2019

(65) Prior Publication Data

US 2019/0329840 A1    Oct. 31, 2019

Related U.S. Application Data

(60) Provisional application No. 62/664,531, filed on Apr. 30, 2018.

(51) Int. Cl.
*B62L 3/02* (2006.01)
*B62M 6/50* (2010.01)
(Continued)

(52) U.S. Cl.
CPC ............... *B62L 3/02* (2013.01); *B62J 43/30* (2020.02); *B62J 45/20* (2020.02); *B62J 45/411* (2020.02);
(Continued)

(58) Field of Classification Search
CPC .. B62M 6/50; B62M 25/08; B62M 2025/006; B62M 9/122; B62M 9/132; B62J 3/00;
(Continued)

(56) References Cited

U.S. PATENT DOCUMENTS 9,346,516 B2    5/2016 Song
9,550,489 B2    1/2017 Voigtlaender et al.
(Continued)

FOREIGN PATENT DOCUMENTS

CN    201729225 U    2/2011
CN    202807012 U    3/2013
(Continued)

OTHER PUBLICATIONS

Extended European Search Report (EESR) dated Sep. 27, 2019.

*Primary Examiner* — Richard M Camby
(74) *Attorney, Agent, or Firm* — Nyssa Inc.

(57) ABSTRACT

There is provided a method comprising receiving at a controller an input comprising a channel output from an input channel of a vehicle. The input is triggered by an operation of the vehicle by an operator. The input channel has a corresponding direct operational manifestation. The method also comprises comparing at the controller the input with a set of input patterns to select from the set of input patterns a target input pattern corresponding to the input, and generating at the controller a control output corresponding to the target input pattern. The control output is configured to cause in the vehicle a target operational manifestation different than the direct operational manifestation. Furthermore, the method comprises sending the control output from the controller to the vehicle.

20 Claims, 7 Drawing Sheets

(51) Int. Cl.
    *B62J 45/20*       (2020.01)
    *B62J 50/21*       (2020.01)
    *B62J 43/30*       (2020.01)
    *B62J 45/411*     (2020.01)
    *B62J 45/412*     (2020.01)
    *B62J 45/415*     (2020.01)
    *B62J 45/416*     (2020.01)

(52) U.S. Cl.
    CPC ........... *B62J 45/412* (2020.02); *B62J 45/415* (2020.02); *B62J 45/416* (2020.02); *B62J 45/4152* (2020.02); *B62J 50/21* (2020.02); *B62M 6/50* (2013.01)

(58) Field of Classification Search
    CPC ... B62J 99/00; B62J 45/20; B62J 45/40; B62J 50/20; B62J 45/4152; B62K 23/06; B62L 3/02
    See application file for complete search history.

(56) References Cited

U.S. PATENT DOCUMENTS

| | | | |
|---|---|---|---|
| 10,245,937 B2* | 4/2019 | Gillett | B60K 7/0007 |
| 2002/0030601 A1 | 3/2002 | Yano et al. | |
| 2002/0120382 A1* | 8/2002 | Hatanaka | B60L 50/20 |
| | | | 701/70 |
| 2005/0195094 A1 | 9/2005 | White | |
| 2007/0024435 A1* | 2/2007 | Takamoto | B62M 25/08 |
| | | | 340/456 |
| 2009/0181826 A1 | 7/2009 | Turner | |
| 2012/0022757 A1 | 1/2012 | Lee et al. | |
| 2013/0179016 A1 | 7/2013 | Gale | |
| 2015/0073656 A1 | 3/2015 | Takamoto et al. | |
| 2015/0120240 A1 | 4/2015 | Fujita | |
| 2015/0367860 A1 | 12/2015 | Koehler et al. | |
| 2016/0339986 A1 | 11/2016 | Jordan et al. | |
| 2017/0144724 A1 | 5/2017 | Murugesan et al. | |
| 2017/0297651 A1 | 10/2017 | Tsuchizawa et al. | |

FOREIGN PATENT DOCUMENTS

| | | |
|---|---|---|
| CN | 202827905 U | 3/2013 |
| CN | 103661772 A | 3/2014 |
| CN | 104260816 A | 1/2015 |
| CN | 104648591 A | 5/2015 |
| CN | 104787221 A | 7/2015 |
| CN | 104973197 A | 10/2015 |
| CN | 204937313 U | 1/2016 |
| CN | 105438384 A | 3/2016 |
| CN | 105539707 A | 5/2016 |
| CN | 105905117 A | 8/2016 |
| DE | 9215910 U1 | 3/1993 |
| DE | 19524397 A1 | 1/1997 |
| EP | 1295785 A1 | 3/2003 |
| EP | 1314637 A1 | 5/2003 |
| EP | 2567884 A2 | 3/2013 |
| EP | 2860096 A1 | 4/2015 |
| GB | 2539755 A | 12/2016 |
| JP | H08150982 A | 6/1996 |
| KR | 20120051177 A | 5/2012 |
| KR | 20140136315 A | 11/2014 |
| TW | 499378 B | 8/2002 |
| WO | 9803392 A1 | 1/1998 |
| WO | 2009083787 A1 | 7/2009 |
| WO | 2012035682 A1 | 3/2012 |
| WO | 2013041276 A2 | 3/2013 |
| WO | 2015161887 A1 | 10/2015 |
| WO | 2017118903 A1 | 7/2017 |

* cited by examiner

METHOD AND APPARATUS FOR CONTROLLING A VEHICLE

CROSS-REFERENCE TO RELATED APPLICATION

This application claims priority from U.S. Provisional Patent Application No. 62/664,531 filed on Apr. 30, 2018, which is incorporated herein by reference in its entirety.

FIELD

The present specification relates to a method and apparatus for controlling a vehicle, and in particular to a method and apparatus for controlling a vehicle based on an operation of the vehicle by an operator.

BACKGROUND

Many vehicles have a power source to provide the power used to operate the vehicle. Operator-powered vehicles can be fitted with a power source to provide additional power and to augment the operational capability of these vehicles. Vehicle operators can provide input to the vehicle in order to control the operation of the vehicle.

SUMMARY

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the present specification provides an apparatus for a method comprising: receiving at a controller an input comprising a channel output from an input channel of a vehicle, the input triggered by an operation of the vehicle by an operator, the input channel having a corresponding direct operational manifestation; comparing at the controller the input with a set of input patterns to select from the set of input patterns a target input pattern corresponding to the input; generating at the controller a control output corresponding to the target input pattern, the control output configured to cause in the vehicle a target operational manifestation different than the direct operational manifestation; and sending the control output from the controller to the vehicle.

The controller can be configured to be secured onboard the vehicle.

The vehicle can comprise a pedaled vehicle.

The input channel can comprise one or more of: an operating instrument of the vehicle; and a sensor configured to sense a state of the vehicle.

The vehicle can comprise a pedaled vehicle and the operating instrument can comprise one or more of: pedals, a steering handlebar, a brake lever, a gear shifter, and a power assist throttle.

The vehicle can comprise a pedaled vehicle and the sensor can comprise one or more of: a tilt sensor, an incline sensor, a torque sensor, a speed sensor, a force sensor, a steering angle sensor, a position sensor, a proximity sensor, and a weight sensor.

The target operational manifestation can comprise changing a mode of operation of the vehicle.

The method can further comprise generating at the controller an alert output indicating that the target input pattern has been selected from the set of input patterns.

The method can further comprise sending the alert output from the controller to an alert output terminal.

The input at a time $t_1$ can comprise the channel output received through the input channel during a time period $\Delta t$ ending at the time $t_1$.

Another aspect of the present specification provides for a controller comprising: a memory configured to store a set of input patterns; and a processor in communication with the memory, the processor configured to: receive an input comprising a channel output from an input channel of a vehicle, the input triggered by an operation of the vehicle by an operator, the input channel having a corresponding direct operational manifestation; compare the input with the set of input patterns to select from the set of input patterns a target input pattern corresponding to the input; generate a control output corresponding to the target input pattern, the control output configured to cause in the vehicle a target operational manifestation different than the direct operational manifestation; and send the control output to the vehicle.

The controller can be configured to be secured onboard the vehicle.

The vehicle can comprise a pedaled vehicle.

The input channel can comprise one or more of: an operating instrument of the vehicle; and a sensor configured to sense a state of the vehicle.

The vehicle can comprise a pedaled vehicle and the operating instrument can comprise one or more of: pedals, a steering handlebar, a brake lever, a gear shifter, and a power assist throttle.

The vehicle can comprise a pedaled vehicle and the sensor can comprise one or more of: a tilt sensor, an incline sensor, a torque sensor, a speed sensor, a force sensor, a steering angle sensor, a position sensor, a proximity sensor, and a weight sensor.

The target operational manifestation can comprise changing a mode of operation of the vehicle.

The processor can be further configured to generate an alert output indicating that the target input pattern has been selected from the set of input patterns.

The processor can be further configured to send the alert output to an alert output terminal.

The input at a time $t_1$ can comprise the channel output received through the input channel during a time period $\Delta t$ ending at the time $t_1$.

BRIEF DESCRIPTION OF THE DRAWINGS

Some example implementations of the present specification will now be described with reference to the attached Figures, wherein.

DETAILED DESCRIPTION

In the case of vehicles, including those powered by a power source such as an electric motor or an engine, the operator can control various aspects of the operation of the vehicle using input channels corresponding to those aspects. As the operational modes and aspects of vehicles become more complex, the corresponding input channels can become correspondingly more numerous and/or complex. In addition, in the case of operator-powered vehicles which are then fitted with a power source, the vehicle may not have existing input channels for controlling the power source.

Furthermore, in the case of some vehicles the operation of the vehicle may be safer and more efficient if the operator maintains throughout the operation of the vehicle physical contact with the basic input channels and visual contact with the outside environment. For example, a bicycle may be more safely and efficiently operated if riders/operators keep their hands on the handlebars, their feet on the pedals, and their eyes on the road while riding. Adding additional input channels used to control a power source or the various operational modes of such vehicles can act as interruptions of the operator's physical contact with the basic input channels or visual contact with the surrounding environment.

Figure 1:
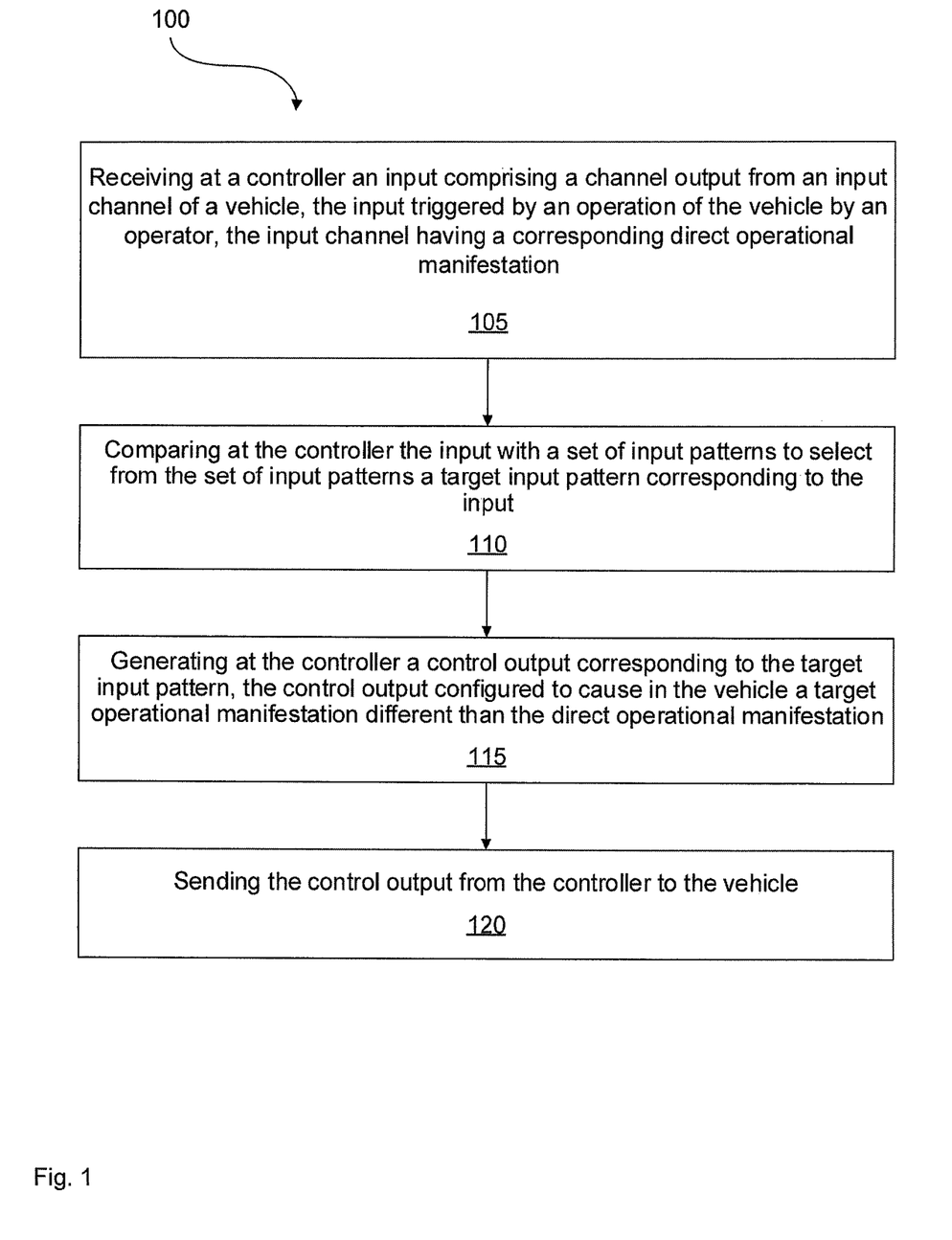
FIG. 1 shows a flowchart depicting an example method of controlling a vehicle.

If the operator can send added or more complex control input to the vehicle using the existing and/or basic input channels, the need for increasingly numerous, complex, and/or distracting input channels can be reduced. FIG. 1 shows a flowchart depicting an example method 100 of controlling a vehicle. At box 105 an input can be received at a controller. The input can comprise a channel output from an input channel of a vehicle. The input can be triggered by an operation of the vehicle by an operator. Moreover, the input channel can have a corresponding direct operational manifestation.

The input can comprise a digital or analogue electrical signal. For example, the signal can comprise changes in the voltage over time, measured over a given period of time. The controller can comprise a device or system that receives and processes the input. Example controllers are described in greater detail below in relation to FIG. 7. In some examples, the controller can be configured to be secured onboard the vehicle. In other examples, the controller can be in remote or wireless communication with the vehicle.

The vehicle can have one or more input channels used to send control signals to the controller to control the operation of the vehicle. For example, the input channels can comprise operating instruments of the vehicle. When the vehicle is a pedaled vehicle such as a bicycle, the operating instruments can comprise pedals, a steering handlebar, a brake lever, a gear shifter, a power assist throttle, and the like. In addition, in some examples the input channels can comprise one or more sensors configured to sense a state of the vehicle itself and/or its environment. Again, when the vehicle is a pedaled vehicle such as a bicycle, the sensors can comprise a tilt sensor, an incline sensor, a torque sensor, a speed sensor, a force sensor, a steering angle sensor, a position sensor, a proximity sensor, a weight sensor, and the like.

Figure 2:
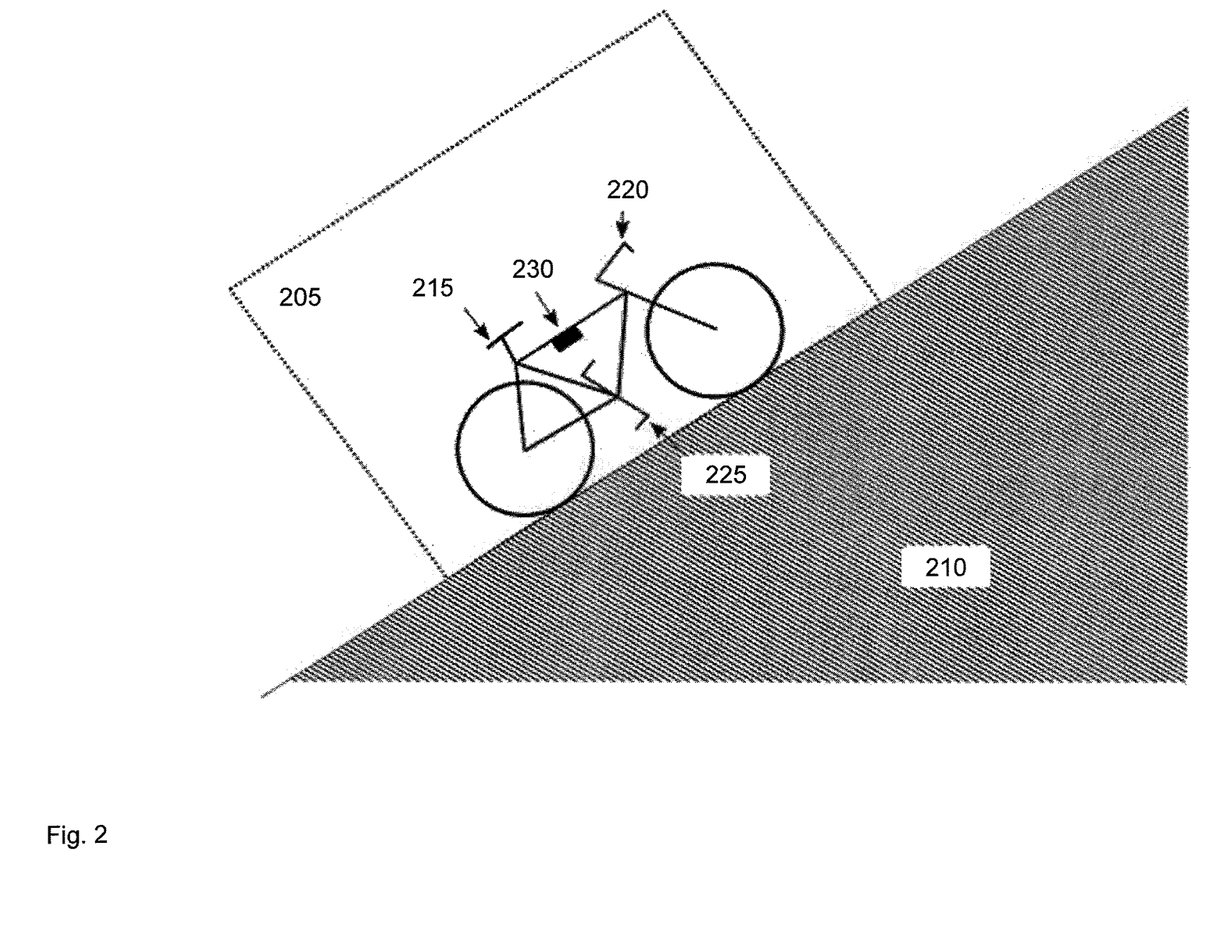
FIG. 2 shows a schematic representation of an example bicycle.

FIG. 2 shows a schematic representation of an example bicycle 205 on an incline 210. Bicycle 205 comprises seat 215, steering handlebars 220, pedals 225, and a controller 230. While not shown in FIG. 2, bicycle 205 can also comprise the other operating instruments and sensors described herein.

The channel output can comprise the information that is transmitted through the corresponding input channel. In some examples, the channel output can comprise electrical signals. For example, when the input channel comprises a sensor or electronic (i.e. control-by-wire) operating instruments, the channel output can comprise an electrical signal. In other examples, the input channel can comprise a mechanical, hydraulic, or pneumatic mechanism used to transmit a force. In these examples a transducer or other converter can be used to convert the force to an electrical signal to form the channel output. For example, when the input channel comprises a brake lever connected to a mechanical brake line, a transducer or other converter or sensor at the lever or along the brake line can be used sense the braking force or to convert the braking force into an electrical signal to form the channel output of the brake input channel.

The input can be triggered directly or indirectly by an operation of the vehicle by an operator. For example, the input can be triggered directly when an operator squeezes a brake lever thereby triggering a channel output transmitted through the brake input channel. In addition, the input can be triggered indirectly; for example, when a rider rides a bicycle on a hill thereby triggering an incline sensor to sense the bicycle's incline on the hill and send a corresponding channel output through the incline sensor input channel.

The input channel can have a corresponding direct operational manifestation. An operational manifestation of an input channel can comprise the impacts on the operation of a vehicle that an input received through that input channel can have in a given vehicle. A direct operational manifestation can comprise the operational manifestation that is basic or default to the corresponding input channel.

In examples where the input channel comprises an operating instrument of the vehicle, the direct operational manifestation can comprise the basic, customary, and/or default functionality of the instrument. In cases where the vehicle is a bicycle, the brake input channel can have the direct operational manifestation of slowing the bicycle by applying braking force. Similarly, the gear shifter can have the direct operational manifestation of changing gears; the handlebars can have the direct operational manifestation of steering the bicycle; and the pedals can have the direct operational manifestation of applying motive power to the bicycle.

In examples where the input channel comprises a sensor, the direct operational manifestation can comprise the basic, customary, and/or default manner in which the sensed information is used to affect the operation of the vehicle. For example, in the case where the vehicle is an electrically-powered bicycle, the speed or incline sensors can have the direct operational manifestation of turning on or off electric power assist.

Figure 3:
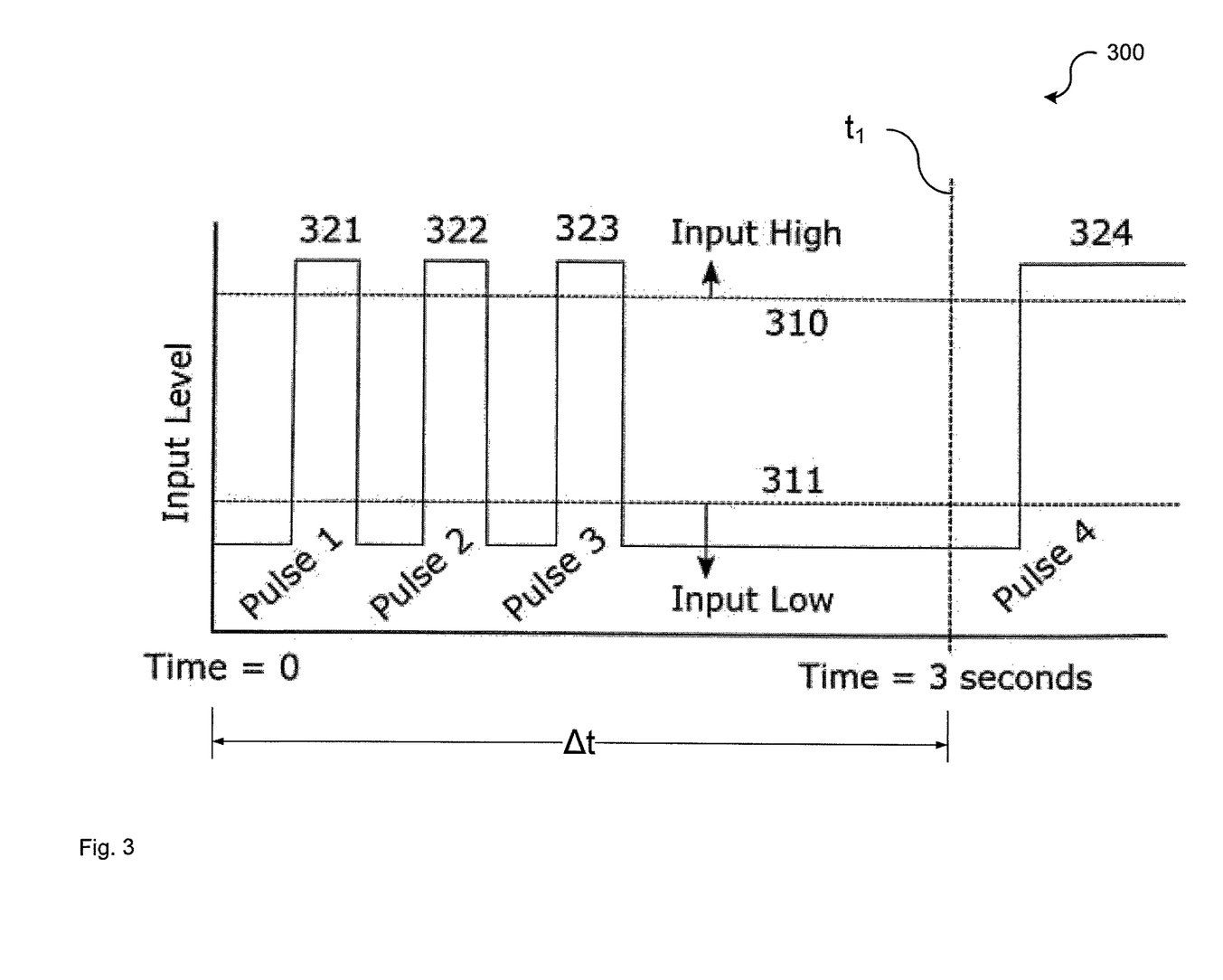
FIG. 3 shows an example input signal.

As discussed above, the input can comprise the channel output from an input channel during a time period. FIG. 3 shows a graph 300 of input level (e.g. voltage) over time for a brake input channel. Graph 300 shows that during the three-second time period Δt ending at $t_1$, the voltage had three pulses 321, 322, and 323 where the voltage exceeded a "high" threshold 310, and that the voltage remained below the "low" threshold 311 the rest of the time. This input pattern can correspond to three successive short taps on or squeezes of the brake lever within a three-second period.

After time $t_1$ graph 300 shows a longer pulse 324, which can correspond to a more sustained braking action.

In some examples, the channel output can be monitored using a rolling time window to obtain the input at any given time. In other words, the input at a time $t_1$ can comprise the channel output received through the input channel during a time period $\Delta t$ ending at the time $t_1$. In the example shown in FIG. 3, the input at time $t_1$ comprises the three pulses 321, 322, and 323. In some examples, not shown, the input can comprise channel output from more than one input channel.

Turning back to method 100, at box 110 the input can be compared at the controller with a set of input patterns, to select from the set of input patterns a target input pattern corresponding to the input. Using FIG. 3 as an example, if the set of input patterns comprises an input pattern having three high pulses within a three-second time period, then that input pattern can be selected as the target input pattern corresponding to the input shown in FIG. 3.

An input pattern can comprise an input measured over a given time period. The input pattern can comprise channel output from one or multiple input channels. In some examples, an input pattern can specify the input channel(s), the time period, and the shape or other characteristics of the input within the time period.

The set of input patterns can be predetermined and stored such that the controller has access to the set. Some input patterns can have a relatively strict definition; e.g. having three high pulses in a three-second time period, the pulses having a width of at least 0.5 second, and being separated from one another by at least 0.5 seconds. Other input patterns can have a relatively less strict definition: e.g. having three high pulses in a three-second window, the pulses having any widths or separations. Determining whether an input corresponds to an input pattern in the set can comprise determining whether the input falls within the definition of the input pattern.

Moreover, at box 115 a control output can be generated at the controller. The control output can correspond to the target input pattern, and can be configured to cause in the vehicle a target operational manifestation different than the direct operational manifestation. At box 120, the control output can be sent from the controller to the vehicle. In some examples, the controller can have access to a predetermined list of control outputs corresponding to the input patterns in the set of input patterns. When the target input pattern is selected, the controller can generate the control output by choosing from the list the control output corresponding to the target input pattern.

The control output can comprise an electrical signal, which can be sent to the various components of the vehicle to produce a target operational manifestation. In the example of an electric bicycle, the control output electrical signals can be used, for example, to control power-assist, regenerative braking, lights, and/or electric bells. In addition, the control output can also pass through a converter or transducer to convert it to mechanical, hydraulic, or pneumatic force, in order to produce the target operational manifestation.

In some examples, the target operational manifestation being different than the direct operational manifestation can comprise the target operational manifestation being unrelated to the types of the direct operational manifestations that the input channel can produce. For example, the input pattern of three quick braking pulses in a three-second window (as shown in FIG. 3) can be mapped to a target operational manifestation of turning on electric power assist. In this example, the target operational manifestation of turning on power assist is different from and unrelated to the direct operational manifestation of the brake input channel, the direct operational manifestation comprising applying the brakes and slowing down the bicycle.

In examples where the input comprises channel output from multiple input channels, the target operational manifestation can be different than the direct operational manifestation of each of the multiple input channels. Setting the target operational manifestation to be different than the direct operational manifestation can allow the same number and/or type of input channels to be used to communicate additional inputs to the vehicle's controller and in turn to produce additional target operational manifestations being different than the direct manifestations.

Moreover, in other examples the target operational manifestation being different than the direct operational manifestation can comprise the target operational manifestation comprising an operational manifestation not available in a given vehicle as one of the types of the direct operational manifestations associated with the input channel. In examples where the input comprises channel output from multiple input channels, the target operational manifestation being different than the direct operational manifestation can comprise the target operational manifestation comprising an operational manifestation not available in a given vehicle as one of the types of the direct operational manifestations associated with at last one of the multiple input channels.

Furthermore, in other examples where the input comprises channel output from multiple input channels, the target operational manifestation being different than the direct operational manifestation can comprise the target operational manifestation comprising an operational manifestation not available in a given vehicle as one of the types of the direct operational manifestations associated with any one of the multiple input channels.

In addition, designating the target operational manifestations to be different than the direct operational manifestations can reduce potential operator confusion that could be caused by target operational manifestations that are so similar or related to the direct operational manifestations that the target operational manifestations could appear to the operator as an input channel or operational malfunction. For example, if an input similar to that shown in FIG. 3 is received through the brake input channel were to produce a target operational manifestation of releasing regenerative braking, the operator could be confused into thinking that the brakes are not working because squeezing the brake lever would have resulted in a reduction in braking force. By setting the target operational manifestation to be unrelated to braking, e.g. turning on power assist, the possibility of such confusion can be reduced.

The vehicle operator can also be aware of the set of input patterns that the controller is using, and the control outputs to which those input patterns correspond. In this manner, the operator can operate the vehicle in a manner that triggers an input, which in turn corresponds to the target input pattern, and produces the target control output and corresponding target operational manifestation. In this manner, the operator can use the existing types and numbers of input channels to control the vehicle to produce target operational manifestations different from the direct operational manifestations of those input channels.

For example, when an operator squeezes the brake lever to trigger an input corresponding to FIG. 3 to be received through the brake input channel, which input is then matched with a target input pattern that corresponds to a control output that is configured to turn on power assist, the operator can use the brake lever to turn on power assist which is an operational manifestation different than the direct operational manifestation of the brake input channel.

In some examples, the target operational manifestation can comprise changing a mode of operation of the vehicle. Examples of changing the mode of operation include, but are not limited to, changing from commuting mode to sport mode, changing from power-assist mode to unassisted mode, and the like.

In addition, in some examples method 100 can further comprise generating at the controller an alert output indicating that the target input pattern has been selected from the set of input patterns. Moreover, in some examples the alert output can be sent from the controller to an alert output terminal. The alert output can comprise an electrical signal. The alert output terminal can comprise a sound output terminal, a visual output terminal, and/or a touch-based output terminal. At the output terminal an alert can be generated based on the alert output to indicate to the operator that the input that was triggered by the operator's operation of the vehicle has been matched with a target input pattern and that the operator can expect a target operational manifestation to be produced.

As discussed above, in some examples the input comprises a record of the channel output from one or more input channels over a time period Δt. As such, the controller can have the ability to store and examine a time-based or historical record of the channel output for correspondence with the patterns in the set of input patterns. While the controller determines whether the input matches or corresponds to the input patterns, in some examples the controller can at the same time act on the channel output as the channel output is received. For example, with reference to brake pulses shown in FIG. 3, the brakes can be engaged for the pulses 321, 322, and 323 while at the same time the pattern of three pulses in three-seconds is detected leading, for example, to power assist being turned on.

Figure 4:
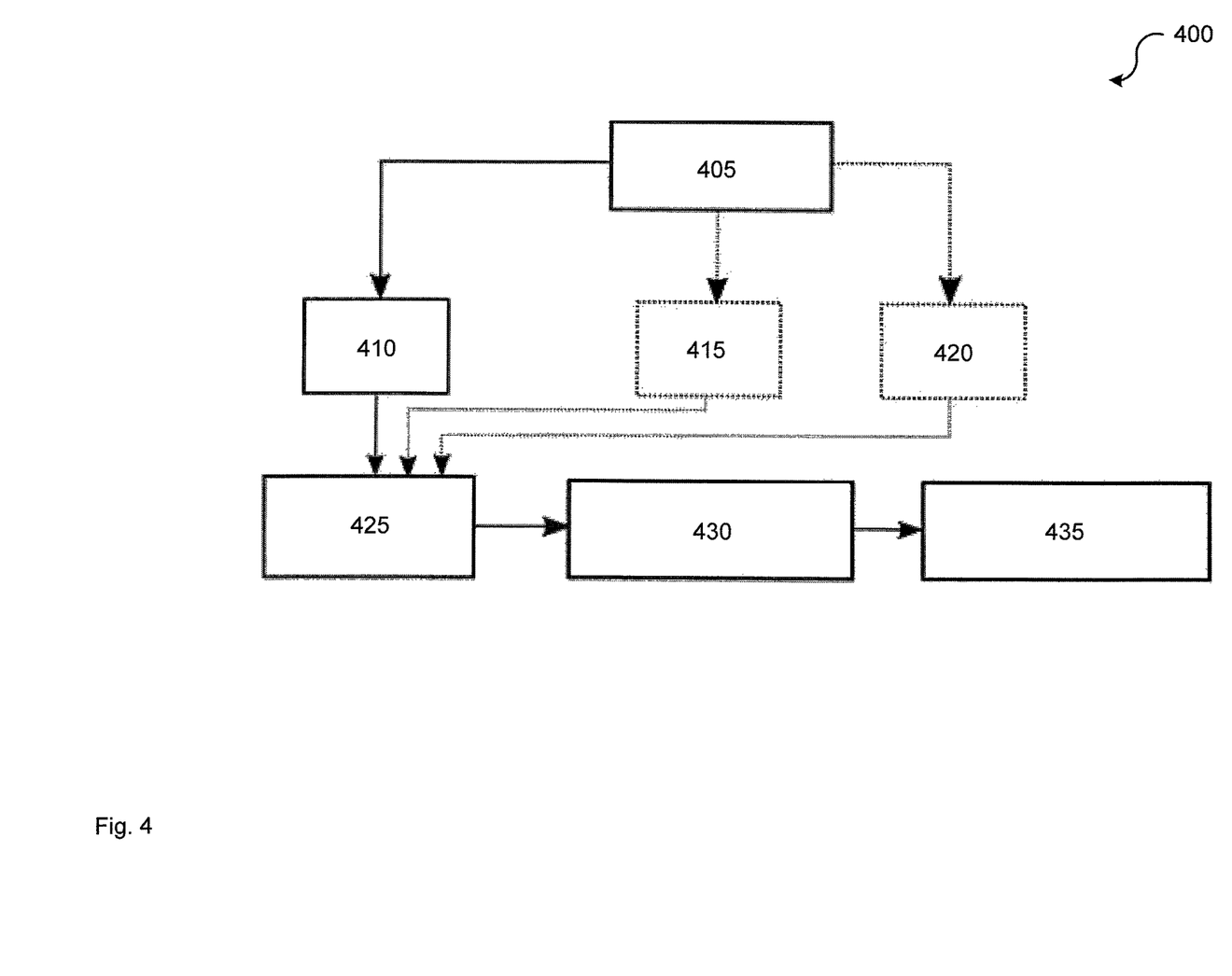
FIG. 4 shows a block diagram depicting another example method of controlling a vehicle.

FIG. 4 shows a block diagram depicting another example method 400 of controlling a vehicle. Operation 405 of the vehicle can trigger input comprising channel output to be received from input channels 410, 415, and 420, which input is received at controller 425. Controller 425 then generates a control output 430 in response to the input. Unlike method 100, in method 400 the controller does not maintain a historical or time-based record of the channel output, and as such simply acts on the non-time-based input as received and does not recognize or match any input patterns. The control output can cause an operational manifestation in the vehicle, which in turn can cause an operator reaction 435.

Figure 5:
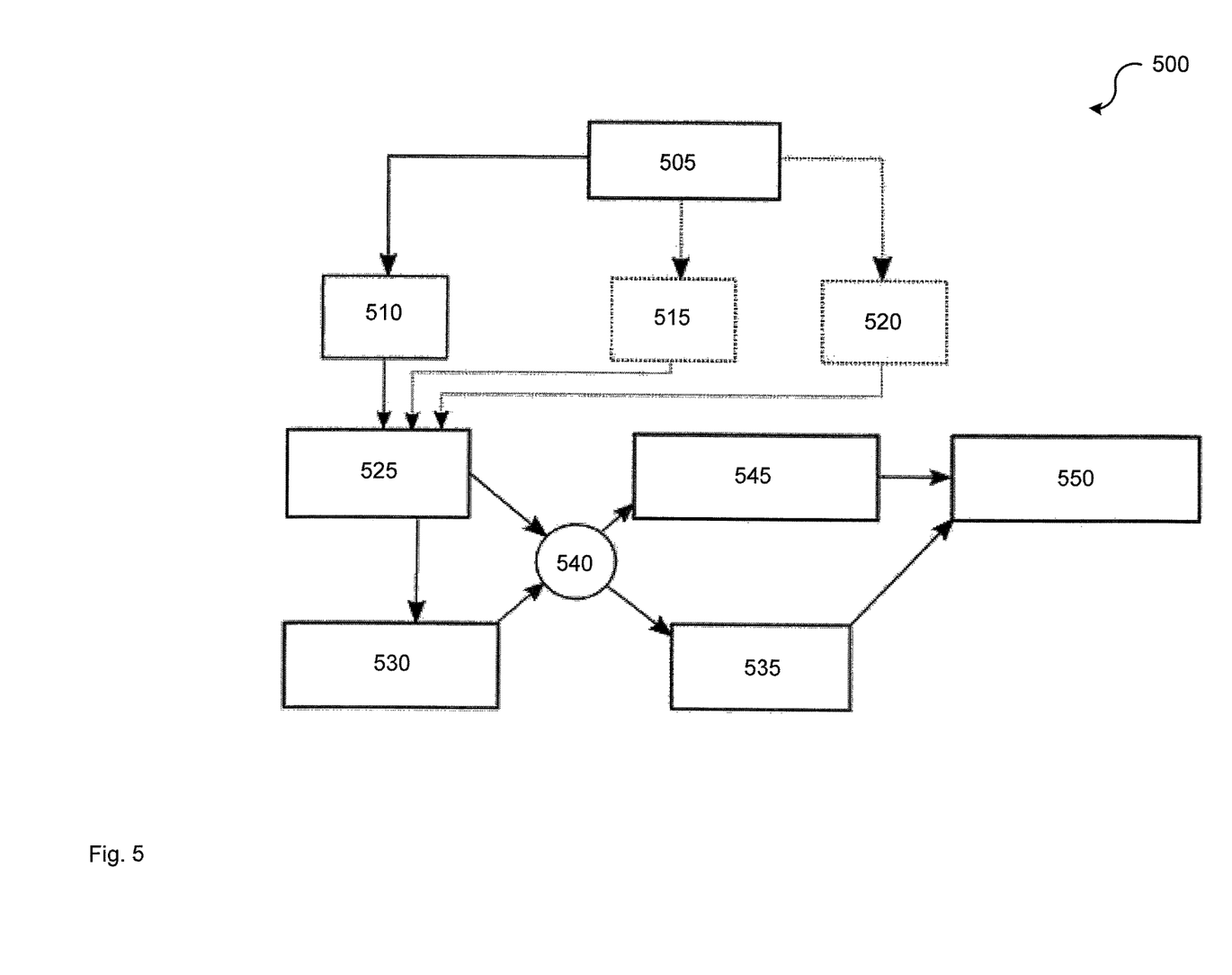
FIG. 5 shows a block diagram depicting another example method of controlling a vehicle.

FIG. 5 shows a block diagram depicting another example method 500 of controlling a vehicle. Operation 505 of the vehicle can trigger input comprising channel output to be received from input channels 510, 515, and 520, which input is received at controller 525. Controller 525 can then detect patterns 530 in a time-based or historical sample of the input, as well as non-time-based inputs. The time-based input patterns and the non-time-based input can be synthesized 540 and/or routed, whereby the non-time-based input can trigger a control output 545 and the time-based input patterns can trigger another control output 535. The control outputs can produce corresponding operational manifestations, which in turn can cause an operator reaction 550.

Figure 6:
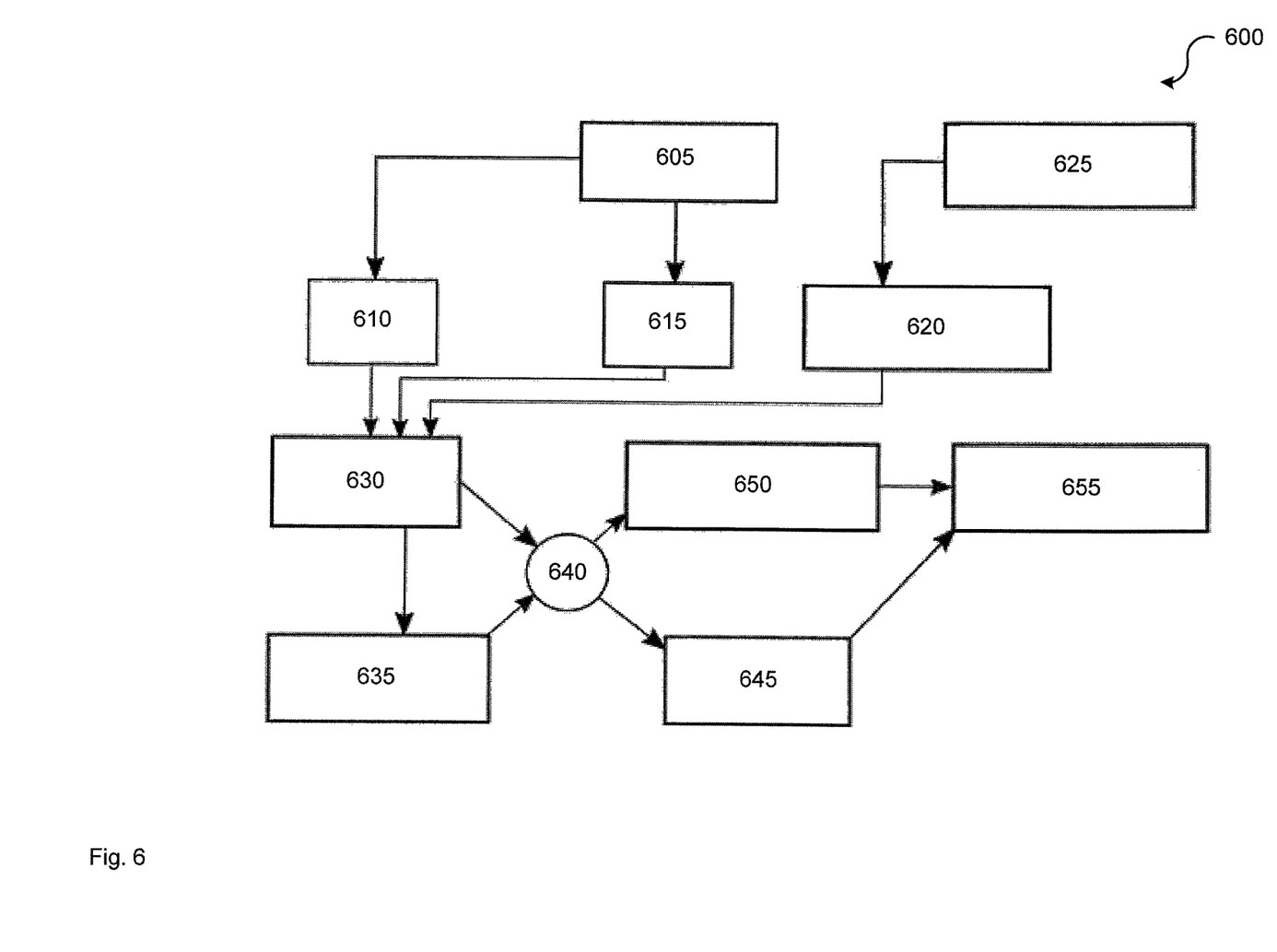
FIG. 6 shows a block diagram depicting another example method of controlling a vehicle.

FIG. 6 shows a block diagram depicting another example method 600 of controlling a vehicle. Operation 605 of the vehicle can trigger input comprising channel output to be received from input channels brake lever 610 and pedals 615 of a pedaled vehicle, which input is received at controller 525. Environmental factors 625 such as incline can trigger a sensor 620 such as an accelerometer to produce an output that also forms part of the input, and is received at controller 630.

Controller 630 can then detect patterns 635 in a time-based or historical sample of the input using, as well as acting on non-time-based inputs. The time-based input patterns and the non-time-based input can be synthesized 640 and/or routed, whereby the non-time-based input can trigger a control output 650 and the time-based input patterns can trigger another control output 645. The control outputs can produce corresponding operational manifestations, which in turn can cause an operator reaction 655.

Using method 600, the operator/rider may be able to intentionally modify the behavior of the vehicle/bicycle when the combination of pedal, brake, and accelerometer inputs is encountered, and select what type of response the vehicle should deliver. This can be referred to as the 'hill-climb' response. The hill-climb response can comprise various responses including, but not limited to, full propulsion power, increased pedal-assist, increased throttle response, and the like.

In some examples, the vehicle can comprise a powered cycle, which in turn can comprise a source of energy and a system for delivering motive power to the wheels of the cycle, and can include a range of sensors and operating input devices which can allow the operator to control and interact with the vehicle. Sensors can include, but are not limited to, one or more of a speed sensor, a torque sensor, an accelerometer, a gyroscope, a hall sensor, a temperature sensor and a pressure sensor.

Operator input devices can further comprise operating instruments such as pedals, gear shifts, brake levers, buttons, handlebars, and electronic devices. A powered cycle can also comprise a control device or a controller which can recognize signals either detected by the sensors, or delivered by other input channels such as the operating instruments. The control device can be programmed to perform a particular behavior if a signal or set of signals is received from one or many of the sensors or other input channels.

Each of the sensors can be configured to sense a particular physical phenomenon and produce a specific type of signal to which it is disposed. In one such configuration, the temperature sensor detects changes in temperature, and produces an electrical voltage. Likewise, each of the operating instruments can be configured to participate in an action on the part of the operator and produce a particular reaction. In one such configuration, the brake levers participate in the application of force by the operator on the lever system, and produce a reaction, which is to deploy the braking system.

Moreover, in some examples a controller can be implemented on a powered cycle which comprises a battery, a controller, a display screen, a gear shift system, a braking system, a pedal speed sensor, a torque sensor, a pressure sensor, an accelerometer, a gyroscope, a temperature sensor, and a plurality of hall sensors. The controller can be configured to react to a specific set of signals received from any of a plurality of sensors or other input channels such as operating instruments. These signals can be produced by manipulation of any of the set of sensors or operating instruments by the operator in an intentional manner.

The manipulation can comprise a pattern of actions taken by the operator, comprising an interaction with the sensors and operating instruments on the vehicle. The interaction can result in a pattern that is different than a pattern that occurs during regular/typical operation of the vehicle. Such manipulations and/or interactions can comprise a given manipulation which is intended by the operator to result in a reaction by the control system which would be unlikely to otherwise occur. In some examples, such patterns of manipulations can comprise a plurality of partial depressions of the brake levers without actuation of the braking system, a sequence of partial revolutions of the pedals in alternating directions, a pattern of vehicle steering not required by the immediate environment, a sequence of changes in operator mass placement, a set of impulses delivered by the operator to the pedals, and the like.

A number of additional examples can involve the combination of given patterns of manipulation with direct signals from the sensors and operating instruments, wherein a given pattern can be identified by the controller and additional information can be acquired via another method. The controller can then control the vehicle according to the actions and/or intention of the operator as indicated by the given pattern, or it can perform another action, depending on the complete set of signals that it has received. Such signals can include, but are not limited to, battery voltage, vehicle speed, elevation, inclination of the vehicle, pedal speed, applied torque to the pedals, vibration of the vehicle, lateral lean of the vehicle, position of the brake levers, gear configuration, steering position of the handlebars, pressure applied to the seat, grip on the handlebars, temperature of all vehicle components, rotational position of the wheel, the states of the various hall sensors, and the like.

In some examples, the operator/rider of a powered cycle, may desire to communicate information to the vehicle and/or vehicle's controller that exceeds or is different than the purpose or the capacity of the input channels available on the vehicle. In some examples, patterns of vehicle manipulation which are unlikely to occur during normal riding maneuvers can be used to permit the rider to send additional information to the controller. For example, the rider can turn on or increase the level of power assist by partially actuating a brake lever three times inside of a three-second period. Moreover, in some examples the rider can turn off or decrease the level of power assist by partially actuating a brake lever of the vehicle three times inside of a three-second period. In addition, in some examples the rider can provide given or unique signals by partially actuating a brake lever on a specific side of the vehicle, when the vehicle is configured to distinguish between signals produced by each brake lever. This can allow the rider to adjust the level of power assist without removing their hands from the handlebars.

Furthermore, in some examples hill-start conditions can be improved. On vehicles which do not have throttle-type operating instruments, stopping and starting on an incline can be challenging for a rider. Some examples can allow the rider to request a boost of propulsion power by applying the brakes, followed by pedaling in alternating directions, beginning with the reverse direction for greater than a specific angle, and followed by the forward direction for greater than a specific angle, followed by release of the brake levers within one second. Other examples can allow the rider to request the same boost of propulsion power by partially actuating the brake levers three times in sequence while the vehicle is present on an incline as detected by the accelerometer, followed by pedaling the vehicle forward.

In addition, in some examples the rider can turn off the assist power without deploying the braking system. In one such example, the rider can tilt the vehicle to one side slightly, followed by a tilt in the opposite direction, and followed by a rotation of the pedals in the reverse direction greater than a predetermined angle.

Moreover, in some examples the rider can initiate regenerative braking without the use of buttons, throttles, or brake levers. In such examples the rider can oscillate the pedals at or above a predefined rate or for longer than a predefined period of time, after which regenerative braking will initiate. In some examples, the level of regenerative braking can continue to increase as the rider continues to oscillate the pedals beyond the predefined period of time, and can abruptly cease when the rider ceases to oscillate the pedals.

In some examples, the methods of the preceding examples can be combined with information from the sensors and operating instruments to augment the information provided by the rider using the aforementioned given manipulation patterns. Information from the sensors and operating instruments can include, but is not limited to, the slope of a hill that the vehicle is present on, the wind speed local to the vehicle, the distribution of the rider's mass on the vehicle, the recent changes to the vehicle control configuration made by the rider, the quantity of energy remaining in the onboard energy storage device, the temperature of the propulsion system of the vehicle, and the like. Such information can be combined with the methods of the preceding examples to alter the response of the vehicle to the given manipulation patterns. Alterations to the response of the vehicle can include, but are not limited to, removal of assist power, increase of assist power, application of regenerative braking, removal of regenerative braking, and the like.

Moreover, in some examples, the vehicle can utilize a given manipulation pattern to change a mode of operation of the vehicle, such that the vehicle responds to operator input in a different way. In some examples the rider can switch the vehicle into a fully-assisted propulsion mode by partially actuating the brake lever on the right side of the vehicle, followed by partially actuating the brake lever on the left side of the vehicle, and repeating this sequence twice. Such a mode can involve continued power delivery by the propulsion system with no requirement for rider input, allowing the vehicle to maintain a constant speed, a constant acceleration, or a constant power, as predetermined by the controller. The braking system can remain as a safety device configured to switch off the propulsion system in the event that the rider selects that this action occur.

Furthermore, in some examples the rider can switch the vehicle into an unassisted propulsion mode by partially actuating the brake lever on the left side of the vehicle, followed by partially actuating the brake lever on the right side of the vehicle, and repeating this sequence twice. Such an unassisted mode can lock the propulsion system into an unpowered state, where the vehicle will not provide power to the wheels. Repeating the sequence which initiated such an unassisted mode, by partially actuating the brake lever on the left side of the vehicle, followed by partially actuating the brake lever on the right side of the vehicle, and repeating this sequence twice, would allow the rider to return the vehicle to a normal state.

In addition, in some examples the vehicle may not possess brakes which generate distinguishable signals from each brake lever. In such examples, the rider can have a reduced set of sensors or operating instruments with which to produce patterns of input signals. The methods described herein may therefore be altered to allow the rider to indicate the decision to initiate a particular behavior on the part of the vehicle without the use of two distinguishable brake signals. In some examples, the assist level can be increased by partially actuating either brake lever three times. The assist level can be reduced to its minimum value by holding the brake lever in a partially-actuated position for greater than a predetermined time interval.

In some examples the vehicle and/or controller can notify the rider that an operational manifestation is being initiated, which manifestation was selected using a given pattern that the rider produced. This notification can be achieved using a visual mechanism, which can comprise a display or sequence of lights. In other examples the notification can be achieved using audible or mechanical mechanisms which can be utilized individually or in combination.

A multiplicity of given and/or unique input patterns can be generated by the rider using the set of available sensors and operating instruments. These input patterns can include, but are not limited to, signals produced by manual disturbance of the accelerometer without mediation by the vehicle, partial actuation of brake lever travel sensors, impact loading of the torque sensor, actuation of buttons whose primary function is disabled, intentional lateral displacement of the accelerometer using the vehicle frame, reversals of pedal motion, and the like. Given and/or unique input patterns can be composed of signals from a combination of operating instruments, in arbitrary or defined time periods. A desired vehicle operational manifestation that can be produced by the controller can be configured to occur when such a given and/or unique pattern of inputs is produced by the rider and recognized by the controller.

Figure 7:
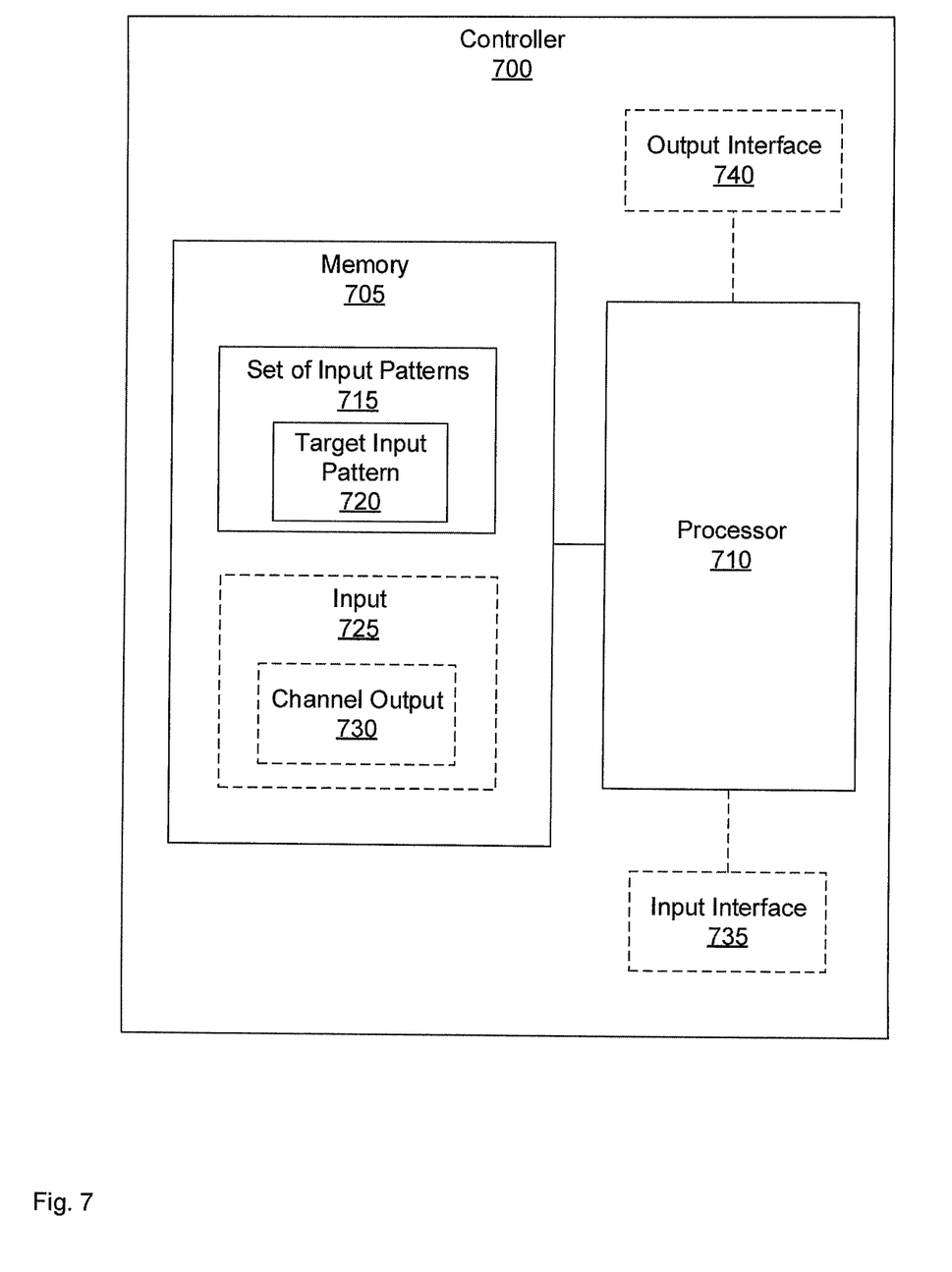
FIG. 7 shows a block diagram of an example controller.

Turning now to FIG. 7, an example controller 700 is shown which can be used to control the operation of a vehicle. Controller 700 comprises a memory 705 in communication with a processor 710. Processor 710 can include a central processing unit (CPU), a graphics processing unit (GPU), a microcontroller, a microprocessor, a processing core, a field-programmable gate array (FPGA), or similar device capable of executing instructions. Processor 710 can cooperate with the memory 705 to execute instructions.

Memory 705 can include a non-transitory machine-readable storage medium that can be an electronic, magnetic, optical, or other physical storage device that stores executable instructions. The machine-readable storage medium can include, for example, random access memory (RAM), read-only memory (ROM), electrically-erasable programmable read-only memory (EEPROM), flash memory, a storage drive, an optical disc, and the like. The machine-readable storage medium can be encoded with executable instructions. Memory 705 can be configured to store a set of input patterns 715, the set including a target input pattern 720.

Processor 710 can be configured to receive an input 725 comprising a channel output 730 from an input channel of a vehicle. The input can be triggered by an operation of the vehicle by an operator. The input channel can have a corresponding direct operational manifestation. FIG. 7 shows input 725 and channel output 730 in dashed lines to indicate that while input 725 and channel output 730 are shown as being stored in memory 705, in some examples input 725 and channel output 730 can be stored in controller 700 outside memory 705, or outside controller 700.

Moreover, processor 710 can be further configured to compare input 725 with set of input patterns 715 to select from set of input patterns 715 a target input pattern 720 corresponding to input 725. In addition, processor 710 can be configured to generate a control output corresponding to target input pattern 720. The control output can be configured to cause in the vehicle a target operational manifestation different than the direct operational manifestation. Processor 710 can also be configured to send the control output to the vehicle. The features and functionalities described in relation to controller 700 can be similar to the corresponding features and functionalities described in relation to method 100 and the other methods described herein.

In some examples, controller 700 can further comprise an input interface 735 and an output interface 740 in communication with processor 710. Input interface 735 can be configured to receive input 725 and output interface 740 can be configured to send the control output to the vehicle. In FIG. 7 input interface 735 and output interface 740 are shown in dashed lines to indicate that these components need not be separate and/or free-standing components, and can be implemented as components or functional modules within other components of controller 700.

In some examples, controller 700 can further comprise one or more of: a housing (not shown) to receive processor 710 and memory 705, a power supply such as a battery (not shown) to provide power to processor 710, an output terminal (not shown) including lights, a screen, a speaker, and the like. Controller 700 can also comprise an input terminal (not shown) including a touch screen, buttons, and the like.

In addition, in some examples the controller can be configured to be secured onboard a vehicle including, but not limited to, a pedaled vehicle such as bicycle and the like. Moreover, in some examples the input channel can comprise one or more of an operating instrument of the vehicle and a sensor configured to sense a state of the vehicle. In some examples the operating instrument can comprise one or more of: pedals, a steering handlebar, a brake, a gear shifter, and a power assist throttle, and the sensor can comprise one or more of: a tilt sensor, an incline sensor, a torque sensor, a speed sensor, a force sensor, a steering angle sensor, a position sensor, a proximity sensor, and a weight sensor.

Furthermore, in some examples the target operational manifestation can comprise changing a mode of operation of the vehicle. In some examples processor 710 can be further configured to generate an alert output indicating that the target input pattern has been selected from the set of input patterns. Processor 710 can also be further configured to send the alert output to an alert output terminal (not shown). In addition, in some examples the input at a time $t_1$ can comprise the channel output received through the input channel during a time period $\Delta t$ ending at the time $t_1$. The features and functionalities described in relation to the controllers described herein can be similar to the corresponding features and functionalities described in relation to method 100 and the other methods described herein.

In addition, while the above description provides examples relating to powered and/or electrical bicycles, it is contemplated that the methods and controllers described herein can be applied to other vehicles including, but not limited to, electric motorcycles, golf carts, and the like. In addition, the operators of these vehicles are not limited to humans, and can in addition and/or instead comprise a partially or fully self-driving system, an artificial intelligence system, and the like. Furthermore, it is also contemplated that the methods and controllers described herein can also be used to control systems or devices, other than vehicles, based on the operation of the systems or devices by respective operators.

In some examples, controller 700 can be used to perform methods 100, 500, 600, and the like. Moreover, the methods and systems described herein can include the features and/or perform the functions described herein in association with the other one of the methods and systems described herein.

It should be recognized that features and aspects of the various examples provided above can be combined into further examples that also fall within the scope of the present disclosure.

We claim:

1. A method comprising:
receiving at a controller an input comprising a channel output from an input channel of a vehicle, the input channel comprising an operating instrument of the vehicle, the input triggered by an operation of the vehicle by an operator interacting with the operating instrument, the operator interacting with the input channel producing a corresponding direct operational manifestation without use of the controller;
comparing at the controller the input with a set of input patterns to select from the set of input patterns a target input pattern corresponding to the input;
generating at the controller a control output corresponding to the target input pattern, the control output configured to cause in the vehicle a target operational manifestation different than the direct operational manifestation; and
sending the control output from the controller to the vehicle.

2. The method of claim 1, wherein the controller is configured to be secured onboard the vehicle.

3. The method of claim 1, wherein the vehicle comprises a pedaled vehicle.

4. The method of claim 1, wherein the vehicle comprises a pedaled vehicle and the operating instrument comprises one or more of: pedals, a steering handlebar, a brake lever, a gear shifter, and a power assist throttle.

5. The method of claim 1, wherein the vehicle comprises a pedaled vehicle, the input channel further comprises a sensor configured to sense a state of the vehicle, and the sensor comprises one or more of: a tilt sensor, an incline sensor, a torque sensor, a speed sensor, a force sensor, a steering angle sensor, a position sensor, a proximity sensor, and a weight sensor.

6. The method of claim 1, wherein the target operational manifestation comprises changing a mode of operation of the vehicle.

7. The method of claim 1, further comprising generating at the controller an alert output indicating that the target input pattern has been selected from the set of input patterns.

8. The method of claim 7, further comprising sending the alert output from the controller to an alert output terminal.

9. The method of claim 1, wherein:
the input comprises a time-based record of the channel output over a first time duration;
the direct operational manifestation is associated with a given input pattern of the input, the given input pattern comprising a corresponding time-based record of the channel output over a second time duration;
the first time duration is longer than the second time duration; and
the target input pattern is different than the given input pattern.

10. A controller comprising:
a memory configured to store a set of input patterns;
a processor in communication with the memory, the processor configured to:
receive an input comprising a channel output from an input channel of a vehicle, the input channel comprising an operating instrument of the vehicle, the input triggered by an operation of the vehicle by an operator interacting with the operating instrument, the operator interacting with the input channel producing a corresponding direct operational manifestation without use of the controller;
compare the input with the set of input patterns to select from the set of input patterns a target input pattern corresponding to the input;
generate a control output corresponding to the target input pattern, the control output configured to cause in the vehicle a target operational manifestation different than the direct operational manifestation; and
send the control output to the vehicle.

11. The controller of claim 10, wherein the controller is configured to be secured onboard the vehicle.

12. The controller of claim 10, wherein the vehicle comprises a pedaled vehicle.

13. The controller of claim 10, wherein the vehicle comprises a pedaled vehicle and the operating instrument comprises one or more of: pedals, a steering handlebar, a brake lever, a gear shifter, and a power assist throttle.

14. The controller of claim 10, wherein the vehicle comprises a pedaled vehicle, the input channel further comprises a sensor configured to sense a state of the vehicle, and the sensor comprises one or more of: a tilt sensor, an incline sensor, a torque sensor, a speed sensor, a force sensor, a steering angle sensor, a position sensor, a proximity sensor, and a weight sensor.

15. The controller of claim 10, wherein the target operational manifestation comprises changing a mode of operation of the vehicle.

16. The controller of claim 10, wherein the processor is further configured to generate an alert output indicating that the target input pattern has been selected from the set of input patterns.

17. The controller of claim 16, wherein the processor is further configured to send the alert output to an alert output terminal.

18. The controller of claim 10, wherein:
the input comprises a time-based record of the channel output over a first time duration;
the direct operational manifestation is associated with a given input pattern of the input, the given input pattern comprising a corresponding time-based record of the channel output over a second time duration;
the first time duration is longer than the second time duration; and
the target input pattern is different than the given input pattern.

19. The method of claim 1, wherein the receiving at the controller the input comprising the channel output form the input channel of the vehicle comprises receiving at the controller the input comprising the channel output from the input channel of the vehicle, the input channel comprising the operating instrument of the vehicle, the operating instrument comprising one or more of a mechanical mechanism, a hydrohalic mechanism, and a pneumatic mechanism to transmit a force to the vehicle without use of the controller.

20. The controller of claim 10, wherein the processor is to receive the input comprising the channel output from the input channel of the vehicle, the input channel comprising the operating instrument of the vehicle, the operating instrument comprising one or more of a mechanical mechanism, a hydraulic mechanism, and a pneumatic mechanism to transmit a force to the vehicle without use of the controller.

* * * * *